United States Patent
Franke et al.

(10) Patent No.: US 10,157,231 B1
(45) Date of Patent: Dec. 18, 2018

(54) SYSTEMS, METHODS, AND DEVICES FOR IDENTIFYING AND PRESENTING IDENTIFICATIONS OF SIGNIFICANT ATTRIBUTES OF UNIQUE ITEMS

(71) Applicant: VAST.COM, INC., Austin, TX (US)

(72) Inventors: David Wayne Franke, Austin, TX (US); Thomas Wyatt Wilbur, Austin, TX (US)

(73) Assignee: VAST.COM, INC., Austin, TX (US)

( * ) Notice: Subject to any disclaimer, the term of this patent is extended or adjusted under 35 U.S.C. 154(b) by 87 days.

(21) Appl. No.: 15/601,249

(22) Filed: May 22, 2017

Related U.S. Application Data

(63) Continuation of application No. 15/253,007, filed on Aug. 31, 2016, now Pat. No. 9,690,857, which is a continuation of application No. 13/924,375, filed on Jun. 21, 2013, now Pat. No. 9,465,873.

(60) Provisional application No. 61/774,477, filed on Mar. 7, 2013.

(51) Int. Cl.
| G06Q 10/00 | (2012.01) |
| G06Q 30/00 | (2012.01) |
| G06F 17/30 | (2006.01) |
| G06Q 30/06 | (2012.01) |

(52) U.S. Cl.
CPC ... *G06F 17/30864* (2013.01); *G06Q 30/0625* (2013.01)

(58) Field of Classification Search
CPC ............ G06Q 10/00–90/00; G06F 1/00–21/00
USPC .............................................. 705/7.11–7.42
See application file for complete search history.

(56) References Cited

U.S. PATENT DOCUMENTS

| 5,459,656 | A | 10/1995 | Fields |
| 5,687,322 | A | 11/1997 | Deaton et al. |
| 6,029,195 | A | 2/2000 | Herz |
| 6,430,539 | B1 | 8/2002 | Lazarus et al. |
| 6,510,406 | B1 | 1/2003 | Marchisio |
| 6,539,392 | B1 * | 3/2003 | Rebane .................. G06Q 30/02 705/26.1 |
| 6,611,726 | B1 | 8/2003 | Crosswhite |
| 6,711,581 | B2 | 3/2004 | Rebane |
| 6,751,600 | B1 | 6/2004 | Wolin |
| 6,751,614 | B1 | 6/2004 | Rao |
| 6,775,664 | B2 | 8/2004 | Lang et al. |
| 6,873,983 | B2 | 3/2005 | Ugai et al. |
| 6,886,005 | B2 | 4/2005 | Davis |
| 7,013,005 | B2 | 3/2006 | Yacoub et al. |
| 7,069,258 | B1 | 6/2006 | Bothwell |

(Continued)

OTHER PUBLICATIONS

U.S. Pat. No. 8,126,881 including its prosecution history, the cited references, and the Office Actions therein.

(Continued)

*Primary Examiner* — Alan S Miller
(74) *Attorney, Agent, or Firm* — Knobbe Martens Olson and Bear, LLP

(57) ABSTRACT

The disclosure herein provides systems, methods, and devices for identifying and presenting identifications of significant attributes of unique items. A significant attributes system for identifying and presenting identifications of significant attributes of unique items comprises an item analysis engine, at least one driver models database, and a model building engine, wherein the item analysis engine comprises an item description receiver and one or more driver calculators.

20 Claims, 10 Drawing Sheets

(56) References Cited

U.S. PATENT DOCUMENTS

| | | |
|---|---|---|
| 7,165,119 B2 | 1/2007 | Fish |
| 7,167,871 B2 | 1/2007 | Farahat et al. |
| 7,206,780 B2 | 4/2007 | Slackman |
| 7,225,107 B2 | 5/2007 | Buxton et al. |
| 7,243,102 B1 | 7/2007 | Naam et al. |
| 7,260,568 B2 | 8/2007 | Zhang et al. |
| 7,283,951 B2 | 10/2007 | Marchisio et al. |
| 7,293,017 B2 | 11/2007 | Hurst-Hiller et al. |
| 7,356,430 B2 | 4/2008 | Miguelanez et al. |
| 7,395,170 B2 | 7/2008 | Scott et al. |
| 7,398,201 B2 | 7/2008 | Marchisio et al. |
| 7,433,885 B2 | 10/2008 | Jones |
| 7,440,955 B2 | 10/2008 | Khandelwal et al. |
| 7,444,308 B2 | 10/2008 | Guyon et al. |
| 7,467,232 B2 | 12/2008 | Fish et al. |
| 7,509,321 B2 | 3/2009 | Wong et al. |
| 7,523,047 B1 | 4/2009 | Neal et al. |
| 7,542,947 B2 | 6/2009 | Guyon et al. |
| 7,565,362 B2 | 7/2009 | Brill et al. |
| 7,593,904 B1 | 9/2009 | Kirshenbaum et al. |
| 7,593,934 B2 | 9/2009 | Li et al. |
| 7,596,552 B2 | 9/2009 | Levy et al. |
| 7,603,348 B2 | 10/2009 | He et al. |
| 7,631,008 B2 | 12/2009 | Carson et al. |
| 7,636,715 B2 | 12/2009 | Kalleh |
| 7,647,314 B2 | 1/2010 | Sun et al. |
| 7,657,493 B2 | 2/2010 | Meijer et al. |
| 7,660,581 B2 | 2/2010 | Ramer et al. |
| 7,664,746 B2 | 2/2010 | Majumder |
| 7,672,865 B2 | 3/2010 | Kumar et al. |
| 7,680,835 B2 | 3/2010 | MacLaurin et al. |
| 7,685,197 B2 | 3/2010 | Fain et al. |
| 7,693,818 B2 | 4/2010 | Majumder |
| 7,693,901 B2 | 4/2010 | Ka et al. |
| 7,716,202 B2 | 5/2010 | Slackman |
| 7,716,217 B2 | 5/2010 | Marston et al. |
| 7,716,225 B1 * | 5/2010 | Dean ............... G06F 17/30867 707/748 |
| 7,716,226 B2 | 5/2010 | Barney |
| 7,725,307 B2 | 5/2010 | Bennett |
| 7,725,451 B2 | 5/2010 | Jing et al. |
| 7,739,408 B2 | 6/2010 | Fish et al. |
| 7,761,447 B2 | 7/2010 | Brill et al. |
| 7,788,252 B2 | 8/2010 | Delli Santi et al. |
| 7,801,358 B2 | 9/2010 | Furmaniak et al. |
| 7,801,843 B2 | 9/2010 | Kumar et al. |
| 7,802,197 B2 | 9/2010 | Lew et al. |
| 7,805,331 B2 | 9/2010 | Demir et al. |
| 7,805,385 B2 | 9/2010 | Steck et al. |
| 7,805,438 B2 | 9/2010 | Liu et al. |
| 7,809,740 B2 | 10/2010 | Chung et al. |
| 7,818,186 B2 | 10/2010 | Bonissone et al. |
| 7,827,060 B2 | 11/2010 | Wright et al. |
| 7,827,170 B1 | 11/2010 | Horling et al. |
| 7,831,463 B2 | 11/2010 | Nagar |
| 7,836,057 B1 | 11/2010 | Micaelian et al. |
| 7,849,030 B2 | 12/2010 | Ellingsworth |
| 7,860,871 B2 | 12/2010 | Ramer et al. |
| 7,865,187 B2 | 1/2011 | Ramer et al. |
| 7,865,418 B2 | 1/2011 | Uenohara et al. |
| 7,870,017 B2 | 1/2011 | Kamath |
| 7,895,193 B2 | 2/2011 | Cucerzan et al. |
| 7,899,455 B2 | 3/2011 | Ramer et al. |
| 7,904,448 B2 | 3/2011 | Chung et al. |
| 7,908,238 B1 | 3/2011 | Nolet et al. |
| 7,912,458 B2 | 3/2011 | Ramer et al. |
| 7,912,713 B2 | 3/2011 | Vair et al. |
| 7,921,068 B2 | 4/2011 | Guyon et al. |
| 7,921,069 B2 | 4/2011 | Canny et al. |
| 7,930,197 B2 | 4/2011 | Ozzie et al. |
| 7,933,388 B1 | 4/2011 | Vanier et al. |
| 7,937,345 B2 | 5/2011 | Schmidtler et al. |
| 7,941,329 B2 | 5/2011 | Kenedy et al. |
| 7,958,067 B2 | 6/2011 | Schmidtler et al. |
| 7,966,219 B1 | 6/2011 | Singh et al. |
| 7,987,261 B2 | 7/2011 | Gamble |
| 8,001,121 B2 | 8/2011 | Wang et al. |
| 8,005,643 B2 | 8/2011 | Tunkelang et al. |
| 8,005,684 B1 | 8/2011 | Cheng et al. |
| 8,005,774 B2 | 8/2011 | Chapelle |
| 8,005,826 B1 | 8/2011 | Sahami et al. |
| 8,015,065 B2 | 9/2011 | Davies |
| 8,024,327 B2 | 9/2011 | Tunkelang et al. |
| 8,024,349 B1 | 9/2011 | Shao et al. |
| 8,027,864 B2 | 9/2011 | Gilbert |
| 8,027,865 B2 | 9/2011 | Gilbert |
| 8,032,405 B2 | 10/2011 | Gilbert |
| 8,051,033 B2 | 11/2011 | Kenedy et al. |
| 8,051,073 B2 | 11/2011 | Tunkelang et al. |
| 8,065,184 B2 | 11/2011 | Wright et al. |
| 8,065,254 B1 | 11/2011 | Das et al. |
| 8,069,055 B2 | 11/2011 | Keen |
| 8,078,606 B2 | 12/2011 | Slackman |
| 8,095,523 B2 | 1/2012 | Brave et al. |
| 8,099,376 B2 | 1/2012 | Serrano-Morales et al. |
| 8,126,881 B1 | 2/2012 | Sethi et al. |
| 8,326,845 B2 | 12/2012 | Sethi et al. |
| 8,375,037 B2 | 2/2013 | Sethi et al. |
| 8,600,823 B1 | 12/2013 | Raines et al. |
| 8,620,717 B1 | 12/2013 | Micaelian et al. |
| 8,868,572 B2 | 10/2014 | Sethi et al. |
| 8,954,424 B2 | 2/2015 | Gupta et al. |
| 9,104,718 B1 | 8/2015 | Levy et al. |
| 9,324,104 B1 | 4/2016 | Levy et al. |
| 9,465,873 B1 | 10/2016 | Franke et al. |
| 9,690,857 B1 | 6/2017 | Franke et al. |
| 9,710,843 B2 | 7/2017 | Levy et al. |
| 2003/0004745 A1 | 1/2003 | Takakura |
| 2003/0088457 A1 | 5/2003 | Keil et al. |
| 2003/0229552 A1 | 12/2003 | Lebaric et al. |
| 2005/0027670 A1 | 2/2005 | Petropoulos |
| 2005/0086070 A1 | 4/2005 | Engelman |
| 2005/0154717 A1 | 7/2005 | Watson et al. |
| 2006/0026081 A1 | 2/2006 | Keil et al. |
| 2006/0041465 A1 | 2/2006 | Woehler |
| 2006/0248035 A1 | 11/2006 | Gendler |
| 2007/0143184 A1 | 6/2007 | Szmanda |
| 2008/0065425 A1 | 3/2008 | Giuffre et al. |
| 2008/0222010 A1 * | 9/2008 | Hudak ................ G06Q 30/02 705/27.1 |
| 2009/0006118 A1 | 1/2009 | Pollak |
| 2009/0112927 A1 | 4/2009 | Chitnis et al. |
| 2011/0055207 A1 | 3/2011 | Schorzman et al. |
| 2012/0005045 A1 | 1/2012 | Baker |
| 2013/0030870 A1 | 1/2013 | Swinson et al. |
| 2013/0179252 A1 | 7/2013 | Dong et al. |
| 2014/0100989 A1 | 4/2014 | Zhang |
| 2015/0220876 A1 | 8/2015 | Sethi et al. |

OTHER PUBLICATIONS

U.S. Pat. No. 8,326,845 including its prosecution history, the cited references, and the Office Actions therein.
U.S. Pat. No. 8,375,037 including its prosecution history, the cited references, and the Office Actions therein.
U.S. Pat. No. 8,868,572 including its prosecution history, the cited references, and the Office Actions therein.
U.S. Pat. No. 9,104,718 including its prosecution history, the cited references, and the Office Actions therein.
U.S. Pat. No. 9,324,104 including its prosecution history, the cited references, and the Office Actions therein.
U.S. Pat. No. 9,465,873 including its prosecution history, the cited references, and the Office Actions therein.
U.S. Pat. No. 9,690,857 including its prosecution history, the cited references, and the Office Actions therein.
U.S. Pat. No. 9,710,843 including its prosecution history, the cited references, and the Office Actions therein.
2015/0220876 including its prosecution history, the cited references, and the Office Actions therein.
U.S. Appl. No. 13/938,045 including its prosecution history, the cited references, and the Office Actions therein. Not yet published, Franke et al.

(56) References Cited

OTHER PUBLICATIONS

U.S. Appl. No. 14/060,434, including its prosecution history, the cited references, and the Office Actions therein. Not yet published, Levy et al.
U.S. Appl. No. 14/566,402 including its prosecution history, the cited references, and the Office Actions therein. Not yet published, Franke et al.
U.S. Appl. No. 14/795,809 including its prosecution history, the cited references, and the Office Actions therein. Not yet published, Levy et al.

* cited by examiner

Figure 4

| Feature — 402 | Price Contribution — 404 |
|---|---|
| Extended Cab | $2260 |
| 4 Wheel Drive | $2390 |
| Towing Package | $940 |
| Certified Pre-Owned | $670 |

SYSTEMS, METHODS, AND DEVICES FOR IDENTIFYING AND PRESENTING IDENTIFICATIONS OF SIGNIFICANT ATTRIBUTES OF UNIQUE ITEMS

CROSS-REFERENCE TO RELATED APPLICATIONS

This application is a continuation of U.S. patent application Ser. No. 15/253,007, titled SYSTEMS, METHODS, AND DEVICES FOR IDENTIFYING AND PRESENTING IDENTIFICATIONS OF SIGNIFICANT ATTRIBUTES OF UNIQUE ITEMS, filed Aug. 31, 2016, which is a continuation of U.S. patent application Ser. No. 13/924,375, titled SYSTEMS, METHODS, AND DEVICES FOR IDENTIFYING AND PRESENTING IDENTIFICATIONS OF SIGNIFICANT ATTRIBUTES OF UNIQUE ITEMS, filed Jun. 21, 2013, which claims the benefit of U.S. Provisional Application No. 61/774,477, titled SYSTEMS, METHODS, AND DEVICES FOR IDENTIFYING SIGNIFICANT ATTRIBUTES OF UNIQUE ITEMS, filed Mar. 7, 2013. Each of the foregoing applications is hereby incorporated by reference herein in its entirety.

BACKGROUND

Field

The disclosure relates generally to the field of identifying significant attributes of items, and more specifically to systems, methods, and devices for identifying and presenting identifications of significant attributes of unique items.

Description

In considering the pricing of new products, the price often comprises a dollar amount for the base product and one or more dollar amounts for any additional features or attributes of the product. For example, new cars are marketed with a window sticker detailing the dollar amount for the base vehicle and for each of the options added to the vehicle. For new cars of the same make and model (for example, Ford F-150 truck), the additive dollar values for additional features and attributes are typically the same for each vehicle. When considering new vehicles of different models or different make and model, the additive dollar amounts are often still similar to one another. For example, the price of a DVD player is relatively uniform across new pickup trucks from different manufacturers. These additive dollar amounts for new vehicles often reflect the manufacturer's cost, such as material, labor, and other manufacturing costs, plus some profit. Similarly, for new homes, the construction costs, such as materials and labor plus the cost of additional amenities, for example, appliances, etc., plus some profit often determines the price for the home.

When items such as used cars and existing homes are considered for resale, each item is unique and will be priced in the context of the current marketplace. Although the total price placed on such an item can often still be attributed to the various features or attributes of the item, the valuation placed on each individual feature or attribute will likely be different. Accordingly, it can be advantageous to have systems, methods, and devices for identifying and presenting significant attributes of unique items, customizable items, and/or items having varying conditions, such as used vehicles and homes.

SUMMARY

The disclosure herein provides systems, methods, and devices for identifying and presenting identifications of significant attributes of unique items, customizable items, and/or items having varying conditions, such as used vehicles, homes, commercial real estate, household goods, collectibles, automotive components, and the like.

In some embodiments, a significant attributes system for identifying and presenting identifications of significant attributes of unique items comprises: an item analysis engine configured to determine which of a plurality of attributes of a selected item are driver attributes, the item analysis engine comprising: an item description receiver configured to electronically receive item data, the item data being related to the plurality of attributes of the selected item; and one or more driver calculators configured to apply one or more driver models to the plurality of attributes to identify which of the plurality of attributes of the selected item are driver attributes; wherein the item analysis engine is configured to electronically present the identification of which of the plurality of attributes of the selected item are driver attributes; at least one driver models database configured to electronically store information relating to the one or more driver models and to electronically communicate with the item analysis engine; and a model building engine configured to generate the one or more driver models by applying one or more model specifications to data relating to user activity, wherein the data relating to user activity comprises logged interactions of users with a plurality of unique items.

In certain embodiments, a computer-implemented method for identifying and presenting identifications of significant attributes of unique items comprises: logging, using a computer system, interactions of users with a plurality of unique items, wherein the logging comprises electronically monitoring actions of the users interacting with one or more item listing systems presenting for sale the plurality of unique items; generating, using the computer system, one or more driver models by applying one or more model specifications to data relating to the logged interactions of the users with the plurality of unique items; storing the one or more driver models in an electronic driver models database; receiving, using the computer system, electronic item data relating to a plurality of attributes of a selected item; applying, using the computer system, the one or more driver models stored in the electronic driver models database to the plurality of attributes of the selected item to identify which of the plurality of attributes of the selected item are driver attributes; and presenting electronically the identification of which of the plurality of attributes of the selected item are driver attributes; wherein the computer system comprises a computer processor and electronic memory.

In some embodiments, a computer readable, non-transitory storage medium having a computer program stored thereon for causing a suitably programmed computer system to process by one or more processors computer-program code by performing a method for identifying and presenting identifications of significant attributes of unique items when the computer program is executed on the suitably programmed computer system comprises: logging, using a computer system, interactions of users with a plurality of unique items, wherein the logging comprises electronically monitoring actions of the users interacting with one or more item listing systems presenting for sale the plurality of unique items; generating, using the computer system, one or more driver models by applying one or more model specifications to data relating to the logged interactions of the users with the plurality of unique items; storing the one or more driver models in an electronic driver models database; receiving, using the computer system, electronic item data relating to a plurality of attributes of a selected item; applying, using the computer system, the one or more driver models stored in the electronic driver models database to the plurality of attributes of the selected item to identify which of the plurality of attributes of the selected item are driver attributes; and presenting electronically the identification of which of the plurality of attributes of the selected item are driver attributes; wherein the computer system comprises a computer processor and electronic memory.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which:

FIG. 4 depicts an example output of an embodiment of applying a price driver model to an item.

DETAILED DESCRIPTION OF THE EMBODIMENTS

Figure 1:
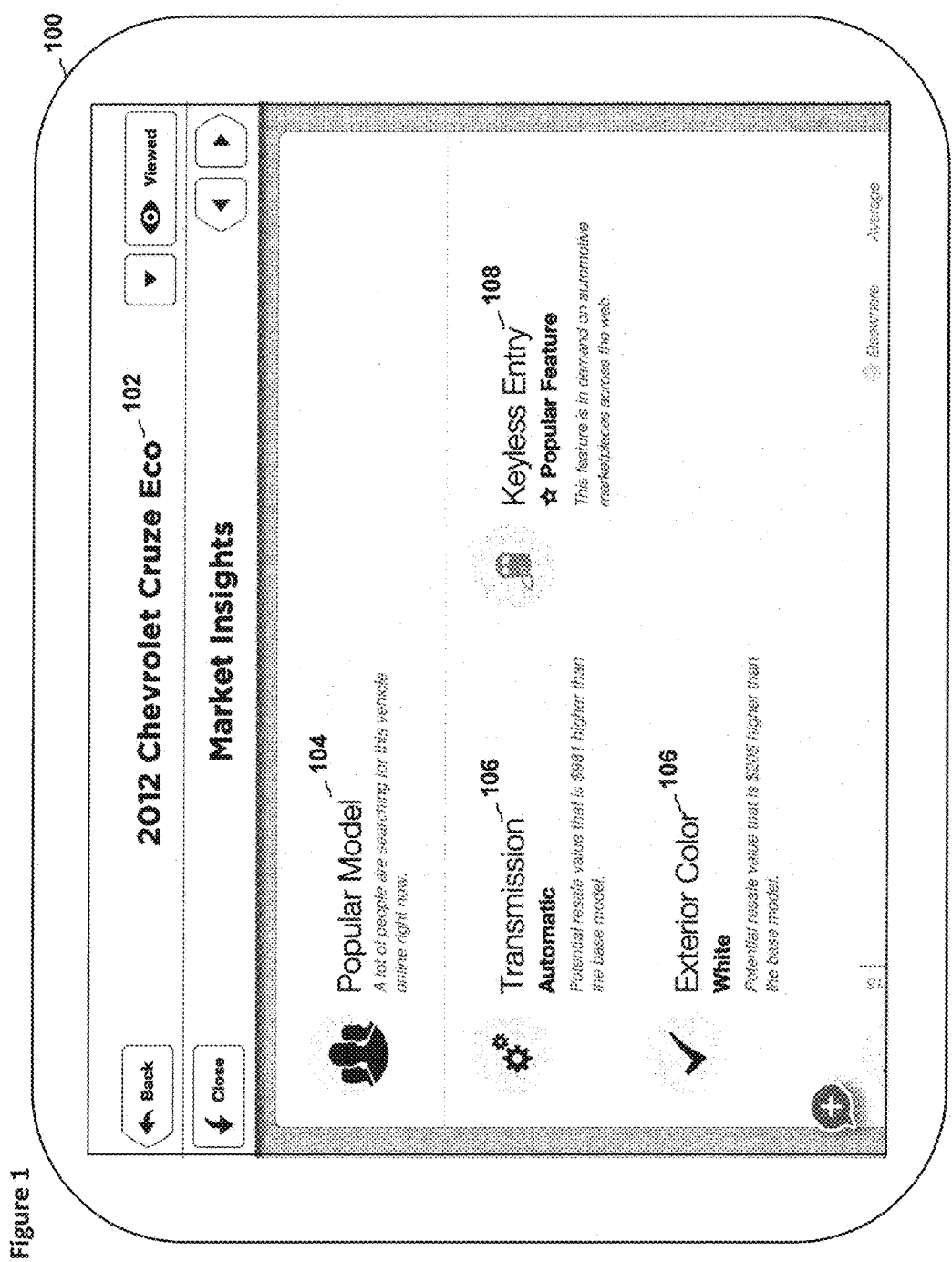
FIG. 1 is an embodiment of a schematic diagram illustrating a user access point system.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

When items such as used cars and existing homes are considered for resale, each item is unique and will be priced in the context of the current marketplace. The total price placed on such an item can often be attributed to the various features or attributes of the item. From a seller's perspective, the valuation placed on each individual feature or attribute will likely be the perceived utility or value of the feature in the mind of the seller, plus possibly some market considerations like scarcity, popularity, and other geographic factors. From the buyer's perspective, the valuation of individual features will often differ from those of the seller, and from the original valuation placed on the features by the manufacturer. Accordingly, it can be advantageous to have systems, methods, and devices for identifying and presenting significant attributes of unique items, customizable items, and/or items having varying conditions, such as used vehicles and homes.

The disclosure herein provides methods, systems, and devices to analyze a unique item, such as a used vehicle, to identify significant or driver attributes of the item. In an embodiment, a system can be configured to generate price driver and/or demand driver models by logging and analyzing interactions of users with electronic listings of various items for sale. The system can be configured to apply these price and demand driver models to data relating to a selected item to identify which attributes of the selected item are price drivers and which are demand drivers. In some embodiments, the system can be configured to electronically receive a description of a selected item from a user or requesting system and to return an identification of significant or driver attributes of the selected item as described in further detail below.

In order to better explain the pricing of individual unique items, such as used cars and existing homes, the disclosure herein provides methods, systems, and devices to identify those features that are contributing to the price of the product, along with an estimate of the dollar amount attributable to each of these features. In some embodiments, these significant features or attributes are called price drivers. Price drivers can be used to explain a price difference between two products that otherwise might look the same, or very similar. For example, a vehicle might have high performance tires that are contributing to the overall price of the vehicle, and identifying this fact can help to explain a price difference between two vehicles that are similar except for the tires. Price drivers and their associated dollar amounts can in some embodiments be used to implement a measure of vehicle similarity. For example, a system for measuring the similarity of two or more unique items may be configured to consider the items to be more dissimilar as the difference in value of their different features or attributes becomes greater.

The disclosure herein also provides embodiments which identify the features or attributes of an item that are contributing to the demand for the item. In some embodiments, the significant features or attributes that contribute to the demand of a unique item are called demand drivers. Demand drivers can, for example, be used to explain why one item is likely to sell faster than another item. For example, vehicles with leather seats may be in higher demand in a particular marketplace, thereby resulting in a greater likelihood of being sold quickly, or at least sooner than a vehicle that has cloth seats. The demand influence can work in both directions. For example, a feature that adds to the price of a product but is in low demand may result in a longer time to sell the product with this feature. For example, a vehicle with heated seats might have less interest in the marketplace than a vehicle without heated seats in a warm climate.

An initial sticker price or pricing breakdown of a new item may have little or no bearing on the price of the same item when it is offered for resale as a used item. Therefore, it is desirable to have systems, methods, and devices, to analyze unique items to determine the influence that different significant attributes or features have to the pricing and/or demand of that item. In one embodiment, a price driver model is constructed by analyzing historical used items offered for sale and any user interactions with the item listings. This model may, for example, account for the price of the base product and the incremental dollar amount for each of the features or attributes added to the product. In some examples, it will be found from the historical data that some features will not have any statistically significant correlation to the reselling price, and these features thus will not become price drivers. Such a price driver model may, in some embodiments, incorporate all or some of the features or attributes of the item, in addition to features or attributes that characterize the geographic market conditions, such as supply and demand for the item.

In some embodiments, a demand driver model is constructed that computes a relative performance factor, such as an expected conversion rate, of a unique item given the item's specific set of features and/or attributes. The relative performance factor may, for example, measure whether an item will generate higher, normal, or lower buyer interest than is expected of that type of item. The data used to construct the demand driver model can comprise, for example, how often a user clicks on a link that takes the user to a detailed page about an item, the amount of time a user spends on a page relating to an item, information submitted to an advertiser from a user, a purchase of an item, and/or the like. The demand driver model can be configured to incorporate all or some of the features or attributes of an item, in addition to features that characterize the geographic market conditions, such as supply and demand for an item.

In some embodiments, a significant attributes system is provided that is configure to accept a description of a unique item and to return information describing price and/or demand drivers for that item. For example, a user may submit to the system a description of a used vehicle offered for sale, such as a Honda Accord with a certain number of miles and the various features or options the vehicle has. The description of the unique item may, in some embodiments, also include a description of the geographic location of the item, such as a zip code, city, state, region, etc. The system can be configured to apply price driver and/or demand driver models to the description and return information to the user such as, for example, the fact that this vehicle has leather seats and a sun roof are important contributors to the price. The system may determine that, for example, the leather seats are contributing approximately $500 to the price and the sun roof is contributing approximately $200 to the price. This could allow the user to, for example, account for this price difference when the user is comparing the vehicle to a similar vehicle that does not have leather seats or a sun roof.

With respect to demand drivers, the system can be configured to, for example, report to a user the feature or features that are driving demand for the item. In this example, the system may determine that, while leather seats and a sun roof are significant contributors to the price, the demand for the vehicle is primarily being driven by it having a four cylinder engine instead of a six cylinder engine, because the four cylinder engine saves gas. The system can be configured to additionally determine features or options that are not price or demand drivers. In the current example, if the Honda Accord has power locks, the system may determine that power locks are not a significant price driver and report to the user that the power locks option should not be adding much, if anything, to the price of the vehicle as compared to a similar vehicle without power locks.

One challenge in determining demand drivers of a product or item is separating any position bias from other factors influencing a conversion rate. Examining historical user activity indicates that there is a position bias in user behavior, for example, that items shown higher in a sort order, such as on an automotive website listing used automobiles for sale, the items shown higher in the sort order are more likely to result in user conversion. Therefore, in a system that is analyzing the demand drivers of an item, the system is better able to determine demand drivers if the system can separate the position bias from other factors influencing the conversion rate. For product categories where items are unique and/or have a high churn (such as when products frequently come into the current inventory and frequently are removed from the current inventory as they are sold) a single item will often be viewed at various positions in search results, and hence will have a different expectation of conversion for each impression.

In some embodiments, a position bias model is generated and used to capture how the position of an item, such as the order presented in the search results, impacts the chance that a user will select that item. There are many considerations that would impact the user's choice, including the various features or attributes of the item, and a position bias model can be used to eliminate or at least partially eliminate the position of the item when it is displayed to a user as one of those factors. With a position bias model combined with historical user activity, such as impression and conversion counts, the systems described herein can be configured to anticipate the performance of an item in search results relative to the expected conversion based on the position at which the item was viewed by users in search results.

In some embodiments, one or more price driver and demand driver models are created and become the basis for a service that accepts a description of a unique item and returns price driver and demand driver information related to that item. For example, the description of the unique item may describe a used car or an existing home for sale. The description may also describe the geographic location of that item. The service can be configured to analyze the description of that unique item and to apply the demand driver and/or price driver models to return a list of product features that are contributing to the price, an estimate of the dollar amounts of these contributions, and a list of features that are in demand in the geographic location where the item is offered for sale.

Although various embodiments described herein are described with reference to used vehicles, the concepts described herein may be utilized to identify significant attributes for a variety of unique items, customizable items, items having varying conditions, and even services. For example, the concepts described herein may be used to identify significant attributes for real estate, existing homes, commercial real estate, household goods, customized electronics, customized goods, clothing, automotive components, collectibles, sporting goods, toys, hobby products, gift items, and/or various other types of unique or customizable products or items or products or items having various conditions offered for sale.

As an example of the embodiments described herein being applied to services offered for sale, a person offering a window washing service may be interested in determining which attributes of his or her service are most important to customers. For example, a system may be configured to monitor and/or log listings or advertisements of services offered for sale, such as various competing window washing services. The system can be configured to analyze data relating to historical sales and/or response rates of and/or user interactions with the various service advertisements to develop one or more models that enable the system to identify significant attributes of the services and/or the advertisements listing the services. These techniques may also be applied to various other services, such as dog walking services, computer repair services, car repair services, medical services, insurance services, and various other types of services.

FIG. 1 is an embodiment of a schematic diagram illustrating a user access point system 100. The user access point system 100 can, for example, be configured to access a system as described herein, such as the significant attributes system 202 shown in FIG. 2. The user access point system 100 shown in FIG. 1 can be configured to, for example, accept information related to a unique item for sale, send that information to a significant attributes system, receive information, such as price driver and demand driver information from the significant attributes system, and then display this information to a user of the user access point system 100. The user access point system 100 comprises an item identifier 102, a popularity indicator 104, price driver indicators 106, and demand driver indicators 108. The item identifier 102 can be configured to display information describing the current unique item the user is interested in. In this example, the user is interested in a 2012 Chevrolet Cruise Echo. The popularity indicator 104 can be configured to indicate, for example, the popularity of the model of vehicle the user is currently interested in. In this example, the popularity indicator 104 is indicating that a lot of people are searching for this vehicle online right now. The information presented by the popularity indicator 104 can be retrieved from, from example, a significant attributes system, as shown in FIG. 2.

One or more price driver indicators 106 displayed by the user access point system 100 are configured to indicate various price drivers of the item selected by the user. In this example, the transmission type and exterior color type of the vehicle the user is interested in have been determined to be price drivers. The vehicle has an automatic transmission, which is estimated to add approximately $981.00 to the value of this used vehicle over the value of a base model. The exterior color of this vehicle is white, which adds an estimated $205.00 to the value of a base model. The one or more demand driver indicators 108 are configured to indicate features or attributes of the current item that are contributing significantly to its demand. For example, in this case the item the user is interested in has a keyless entry feature. The demand driver indicator 108 indicates that this keyless entry feature is a popular feature that is in demand on automotive marketplaces across the web. Although in this example the demand driver indicator 108 indicates the feature is in demand across the web, in other examples one or more demand drivers may be indicated as being in demand in certain geographic regions, ZIP codes, etc.

Figure 2:
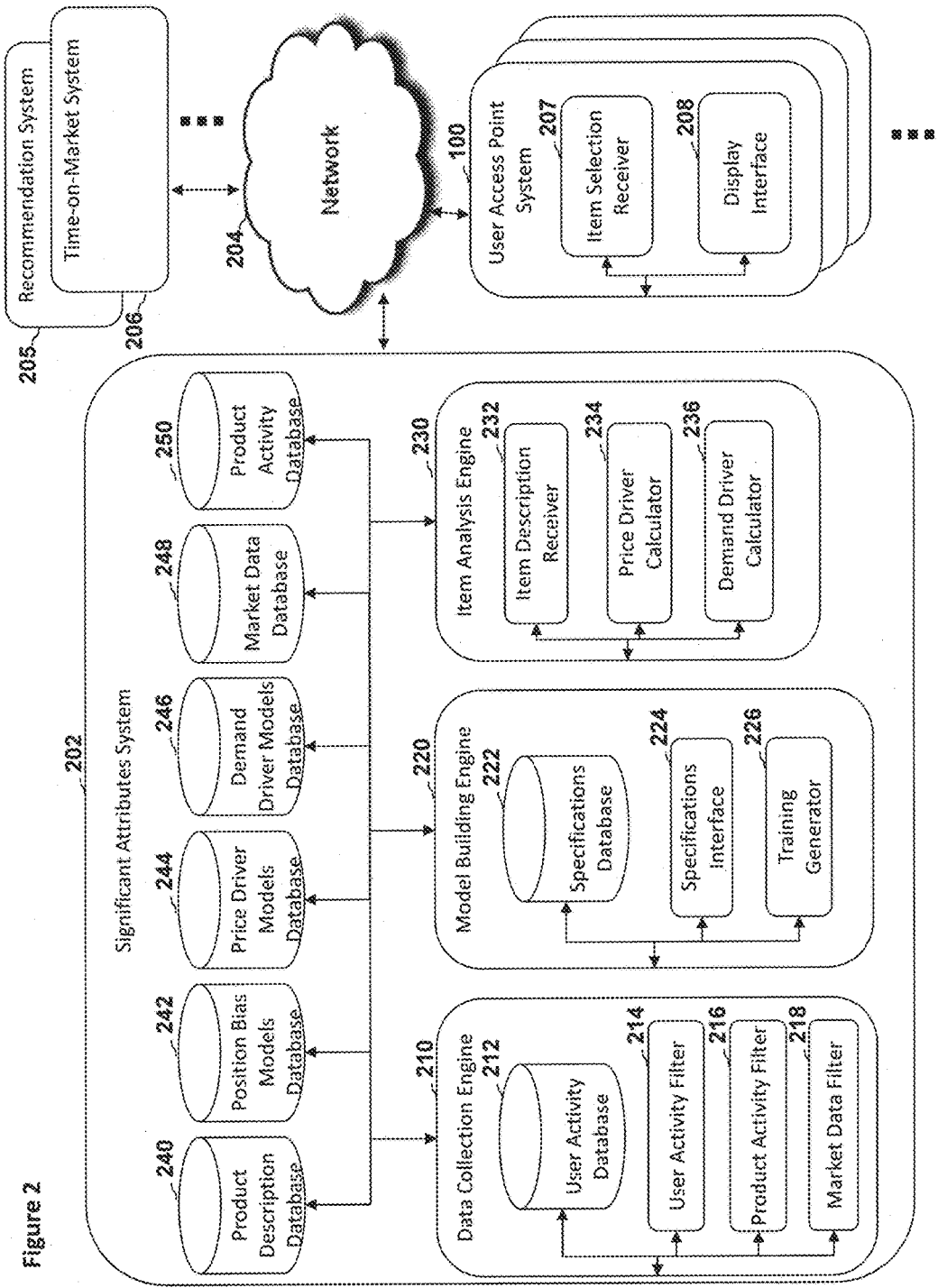
FIG. 2 is a block diagram depicting an embodiment of a significant attributes system in communication with one or more other systems.

The information displayed by the price driver indicators 106 and demand driver indicators 108 can be obtained from, for example, the significant attributes system 202 shown in FIG. 2. The price driver and/or demand driver information displayed by the user access point system 100 can be useful to, for example, a user in the market for a used vehicle to help determine what the user should pay for a particular used vehicle. The information can also be useful to, for example, a user that is selling a used vehicle to help the seller determine which features are in demand and therefore which features the seller should emphasize to a potential purchaser.

FIG. 2 is a block diagram depicting an embodiment of a significant attributes system 202 in communication with one or more other systems. The significant attributes system 202 can be configured to accept information describing a unique item and to return price driver and/or demand driver information related to that unique item. The significant attributes system 202 can be configured to communicate with other systems through, for example, a network 204. The network 204 may comprise a local area network, a wide area network, the internet, a cellular phone network, etc. The significant attributes system 202 can be configured to communicate with, for example, one or more user access point systems 100, such as the user access point system 100 shown in FIG. 1. The significant attributes system 202 can also be configured to communicate with various other systems. For example, a recommendation system 205 can be configured to recommend unique items to potential purchasers based on other unique items the potential purchaser has expressed interest in. The recommendation system 205 can be configured to communicate with the significant attributes system 202 to retrieve estimated price driver and/or demand driver information from the significant attributes system 202 to assist in creating its recommendations. In another example, a time-on-market system 206 can be configured to communicate with the significant attributes system 202 to retrieve price driver and/or demand driver information related to various unique items to implement a system that estimates a time on market for a particular unique item. For example, a time-on-market system 206 may be configured to consider a used vehicle for sale and retrieve price driver and/or demand driver information from the significant attributes system 202 to assist in estimating how long that particular used vehicle will be on the market before it is sold.

One or more user access point systems 100 can comprise an item selection module or receiver 207 and a display module or interface 208. The display interface 208 can be configured to, for example, display the various features shown in the user access point system 100 of FIG. 1. The item selection receiver 207 can be configured to accept input or information from a user to, for example, indicate a unique item the user is interested in and to send that information to the significant attributes system 202 for determination of price drivers and/or demand drivers.

The significant attributes system 202 comprises several systems and databases. The significant attributes system 202 comprises a data collection system or engine 210, a model building engine 220, and an item analysis system or engine 230. The significant attributes system 202 further comprises a product description database or item attributes database 240, a position bias models database 242, a price driver models database 244, a demand driver models database 246, a market data database 248, and a product activity database 250. The data collection engine 210, model building engine 220, and item analysis engine 230 can be configured to communicate with the various databases and other systems to allow the significant attributes system 202 to accept information describing unique items from another system and to return price driver and/or demand driver information relating to that unique item.

The position bias models database 242 can be configured to contain information describing one or more position bias models for use in collecting data on various conversion rates and other item-specific information and in building price driver and demand driver models, as further described below. The price driver models database 244 and demand driver models database 246 can be configured to contain information describing one or more price driver models and demand driver models, respectively. The price driver models and demand driver models can be, for example, generated by the model building engine 220, stored in the databases, and then applied by the item analysis engine 230 to calculate demand drivers and price drivers of unique items.

The product description database 240 can be configured to contain information describing current and/or historical items for sale. For example, the product description database 240 can be configured to contain information on the current inventory of used vehicles for sale in various markets. The product description database 240 can further be configured to contain information describing the various attributes or features of the various items currently listed for sale and/or listed for sale in the past. The information in the product description database 240 can be used, for example, by the data collection engine 210 to analyze historical user activity and/or the model building engine 220 to build price driver, demand driver, and/or position bias models, as further described below. In some embodiments, at least a portion of the data stored in the product description database 240 can be provided by one or more electronic feeds from, for example, a vehicle dealer service provider.

The market data database 248 can be configured to contain, for example, information describing current and/or historical product inventory and user activity by geographic market. In some embodiments, the geographic market information can be organized by, for example, zip code, demographic marketing area, state, national region, and the like. The market data database 248 can be configured to be filled with information and/or updated by the data collection engine 210 and then utilized by the model building engine 220 to build price driver and demand driver models and by the item analysis engine 230 to generate price driver and demand driver information to send to, for example, a user access point system 100.

The product activity database 250 can be configured to contain, for example, information describing user activity related to each unique item described in, for example, the product description database 240. In some embodiments, the user activity can include, for example, unique impressions, clicks, leads, and the like. The product activity database 250 can be configured to, for example, be filled with information and/or updated by the data collection engine 210. In some embodiments, the information stored in the product activity database 250 can be utilized by, for example, the model building engine 220 and/or the item analysis engine 230 in generating models and/or price driver and demand driver information, as further described below.

The data collection engine 210 comprises a user activity database 212, a user activity module or filter 214, a product activity module or filter 216, and a market data module or filter 218. In some embodiments, the data collection engine 210 can be configured to examine historical and/or real time user activity or interactions and/or supply and demand information to help determine price drivers, demand drivers, and position bias. The data collection engine 210 can be configured to collect or log data describing user activities or interactions (for example, impressions, clicks, leads, time spent on a webpage, etc.) from, for example, various internet product search sites or item listing services, by using the user activity filter 214. In some embodiments, the data collection engine 210 is configured to collect or log the data substantially in real time. The user activity filter 214 can be configured to store this data in the user activity database 212. In some embodiments, the user activity database 212 is configured to store data describing at least 1,000, 10,000, 100,000, 1,000,000, 10,000,000 or more user activities or interactions and/or data relating to 1,000, 10,000, 100,000, 1,000,000, 10,000,000 or even over 18,000,000 item listings. The data collection engine 210 can be configured to generate geographic market data for storage in the market data database 248 and/or product activity data for storage in the product activity database 250 by combining the user activity information stored in the user activity database 212 with the product description data stored in the product description database 240 and a position bias model from the position bias models database 242. This process is shown and further described below with reference to FIG. 5.

The model building system or engine 220 comprises a specifications database 222, a specifications module or interface 224, and a training module or generator 226. The specifications database 222 can be configured to contain information describing various model building specifications as defined by the specifications interface 224. The specifications interface 224 can be configured to accept instructions from a user or administrator of the significant attributes system 202 to define one or more model building specifications. In some embodiments, model building specifications may, for example, identify the explanatory and response variables to be considered, the modeling approach, and/or the product attributes that are candidates for price and/or demand drivers. The training generator 226 can be configured to examine the historical or real time data generated by the data collection engine 210 and stored in the market data database 248 and product activity database 250, and to apply specifications from the specifications database 222 to generate price driver models and/or demand driver models to be stored in the price driver models database 244 and/or demand driver models database 246. The training generator 226 can be configured to apply the model construction or training techniques identified in the model specifications, examine the resulting model, and output a description of price drivers and/or demand drivers to be stored in the price driver and/or demand driver models databases. Price driver and demand driver models can then be configured to be accessed by, for example, the item analysis engine 230 to output price drivers and/or demand drivers for a particular unique item. The training generator 226 can be configured use various training techniques, for example, linear regression, non-linear regression, model trees, nearest neighbor analysis, and/or the like. In some embodiments, the model building engine 220 can be configured to update and/or regenerate price driver and/or demand driver models substantially in real time based on newly logged user activity or interaction data from the data collection engine 210.

The position bias models database 242 can be configured to store one or more position bias models. In some embodiments, a position bias model is generated by examining historical data, such as product data with associated user activity and/or geographic market data from the market data database 248 and/or the product activity database 250, to build a model that characterizes any position bias. The position bias model can be used to calculate an expected performance, such as an expected number of conversions, of a unique product, given that the product was viewed in a particular position in a set of search results. In one embodiment, a position bias model is defined by the equation 1/N, where N is the position of the product in the set of search results. This represents the expected number of conversions relative to the number of conversions that occur for the product at position 1. In another embodiment, a position bias model is defined by a log decay model. Given a starting value, a position, an additive adjustment, and an exponent, the decay value is calculated as follows:

decayValue=startValue;
    for (i=2; i<=n; i++) {
        decayValue    *=(1.0−Math.pow(1.0/(i+additiveAdjustment), exponent));
    }

The item analysis engine 230 comprises an item description module or receiver 232, a price driver module or calculator 234, and a demand driver module or calculator 236. The item analysis engine 230 can be configured to accept a unique item's description, using the item description receiver 232, and then to generate price and demand drivers for that item. The item analysis engine 230 can be configured to use geographic market data from the market data database 248 and price and demand driver models from the price driver models database 244 and the demand driver models database 246, and to apply that information to generate price drivers and demand drivers using the price driver calculator 234 and demand driver calculator 236. The application of these models is described in more detail below with reference to FIG. 3.

In some embodiments, the data collection engine 210 operates substantially in real time by logging user interactions with various unique items as the users are interacting with the listings of these unique items. One or more computer systems is necessary for the data collection process due at least in part to the volume of information required to be collected to enable the data collection engine 210 to generate useful data for use by the model building engine 220. A human would not realistically be able to monitor one or more or a multitude of item listing systems substantially in real time, as numerous users are simultaneously interacting with listings of these services. In some embodiments, the data collection engine 210 may comprise 5, 10, 50, 100 or more item listing services or systems that all need to be monitored substantially in real time and substantially simultaneously. In some embodiments, each of the item listing systems may have 5, 10, 50, 100, 1000 or more users using the listing system substantially simultaneously, adding to the need for at least one computer system to monitor the interactions of users with listings.

In some embodiments, other portions of the significant attributes system 202 also operate substantially in real time. For example, when a user of the significant attributes system 202 selects an item the user is interested in identifying driver attributes of, such as by using the user access point system 100, the user access point system 100 is configured to send data relating to the selected item to the significant attributes system 202 through the network 204. The user of the user access point system 100 will expect a response from the significant attributes system 202 in a relatively short amount of time. The user may, for example, expect an identification of driver attributes from the significant attributes system in merely the length of time a webpage takes to load. In some instances, the time available to identify significant attributes of a selected item may comprise a few seconds or even less time, such as less than one second. Therefore, a significant attributes system configured to identify significant attributes of a selected item requires at least one computer system configured to identify the significant or driver attributes substantially in real time. A human would not be able to analyze a selected item's attributes, apply price and demand driver models to the attributes, and present the identified driver attributes all in a manner of seconds or even less time. Rather, if a human were even able to perform these tasks, the human would spend several orders of magnitude more time on the process, which would be unacceptable to most users of such a system.

Not only is one or more computer systems and/or computer hardware required to operate the data collection engine 210 and/or other portions of the significant attributes system 202 to allow the system to operate at an acceptable speed, but a human would not even be able to perform at least some of the operations performed by the significant attributes system 202. For example, the data collection engine 210 in some embodiments requires simultaneous monitoring of multiple item listing services generating websites for display to a multitude of users. A human being would not be able to realistically monitor all of these interactions without the assistance of a computer system. With respect to other portions of the significant attributes system 202, various calculations take place that would be extremely complex for a human to do without the assistance of a computer system. Some examples are the calculations required to generate and apply price and demand driver models.

Additionally, when operating a significant attributes system, a multitude of variables must be tracked. For example, the model building engine 220 may take into account 10, 50, 100, 1000, 10,000, or more unique items in the calculation and building of the price and demand driver models. In addition to the amount of time it would take a human to perform such calculations, it would be difficult, if not impossible, for a human to keep track of all of the variables required for such calculations. Therefore, it can be seen that the operation of a significant attributes system as described herein necessitates the use of computer hardware and/or at least one computer system.

Figure 3:
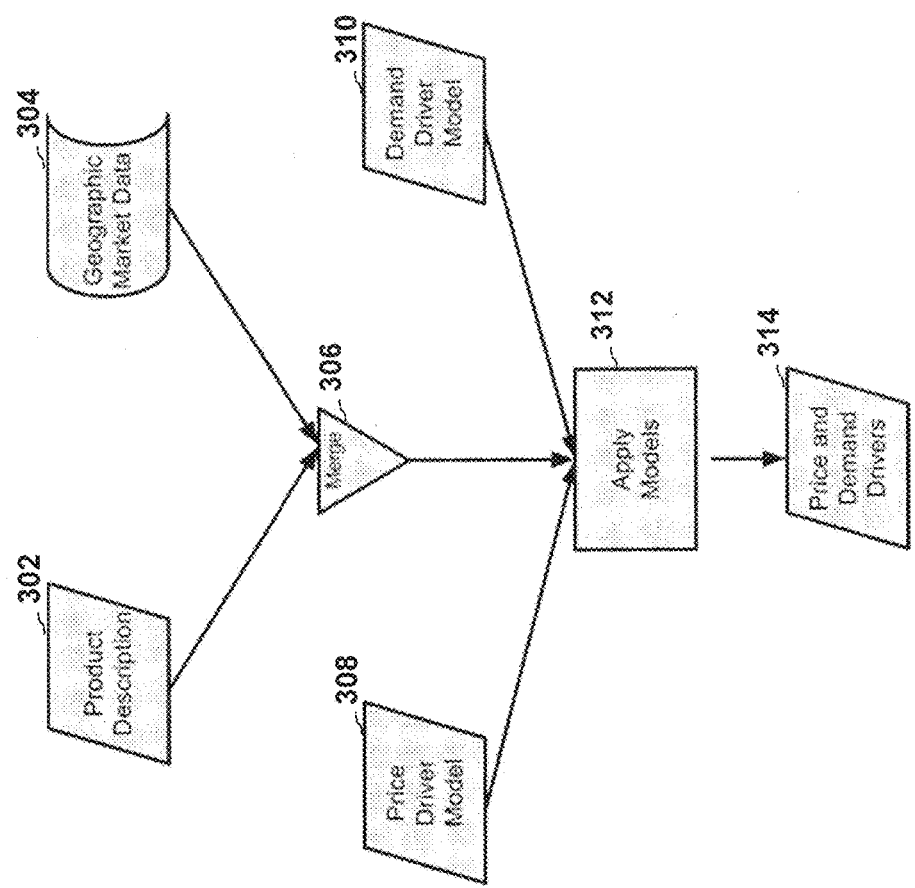
FIG. 3 depicts an embodiment of a process flow diagram illustrating an example of applying one or more models to an item.

FIG. 3 depicts an embodiment of a process flow diagram illustrating an example of applying one or more price driver and/or demand driver models to an item, such as a unique item. In some embodiments, the process shown in FIG. 3 can be performed by, for example, the significant attributes system 202 shown in FIG. 2, and more specifically the item analysis engine 230 of the significant attributes system 202. At block 302 a product description is provided. The product description may in some embodiments comprise a unique identifier of an item. For example, the product description may comprise a unique identifier that identifies a specific item for sale in current inventory. In some embodiments, the unique identifier may identify information stored in the product description database 240 that describes the item's attributes and features. In some embodiments, the product description comprises, rather than, or in addition to a unique identifier, information describing a unique item, such as information describing its various attributes and features. For example, the product description may comprise a listing of year, model, body style, trim, and/or other options and features of a specific used vehicle.

At block 304 geographic market data is provided. For example, the item analysis engine 230 of the significant attributes system 202 receives information from a user or another system describing where the product described in the product description at block 302 is being offered for sale. This information may comprise, for example, a zip code, a demographic marketing area, a state, a national region, and the like. In some embodiments, a user of a significant attributes system 202 may provide the geographic market data along with the product description. In other embodiments, a user provides only the product description, and the item analysis engine 230 retrieves the geographic market data from the market data database 248 and/or the product description database 240, based on the product description and/or unique identifier provided by the user.

At block 306 the product description and geographic market data are merged. For example, the geographic market data can be associated with the product description information. At block 308 a price driver model is provided. For example, the item analysis engine 230 may be configured to retrieve a price driver model from the price driver models database 244. At block 310 a demand driver model is provided. For example, the item analysis engine 230 may be configured to retrieve a demand driver model from the demand driver models database 246.

At block 312 the price driver model and demand driver model are applied. For example, the price driver calculator 234 of the item analysis engine 230 may be configured to apply the price driver model provided at block 308 to the product description and/or geographic market data provided at blocks 302 and 304. The demand driver calculator 236 of the item analysis engine 230 can be configured to apply the demand driver model provided at block 302 to the product description and/or geographic market data provided at blocks 302 and 304. At block 314 the price drivers and demand drivers are output from the item analysis engine 230. For example, FIG. 4 depicts an example output of an embodiment of applying a price driver model to an item. As shown in FIG. 4, four price drivers are illustrated based on a product description describing a Chevrolet Colorado for sale in North Carolina. In this example, the four features or attributes 402 of this product that are determined to be price drivers are that the vehicle has an extended cab, that the vehicle has a four wheel drive option, that the vehicle has a towing package, and that the vehicle is a certified pre-owned vehicle. Column 404 of the table shown in FIG. 4 indicates the anticipated value the item analysis engine 230 determined each of these features or attributes contributes or adds to the base price of a Chevrolet Colorado for sale in North Carolina. In this example, the extended cab option is anticipated to add $2,260.00. The four wheel drive option is estimated to add $2,390.00. The towing package option is estimated to add $940.00. The certified pre-owned option is estimated to add $670.00. Although the embodiment shown in FIG. 4 illustrates the price driver information in a table format, the price driver information may in other embodiments be displayed to a user in various ways and/or sent to another system in various formats. For example, the information may be displayed using a user access point system 100 as shown in FIG. 1. In other embodiments, the price driver information may be sent to another system, such as the recommendation system 205 or time-on-market system 206 shown in FIG. 2 for use within that system.

Figure 5:
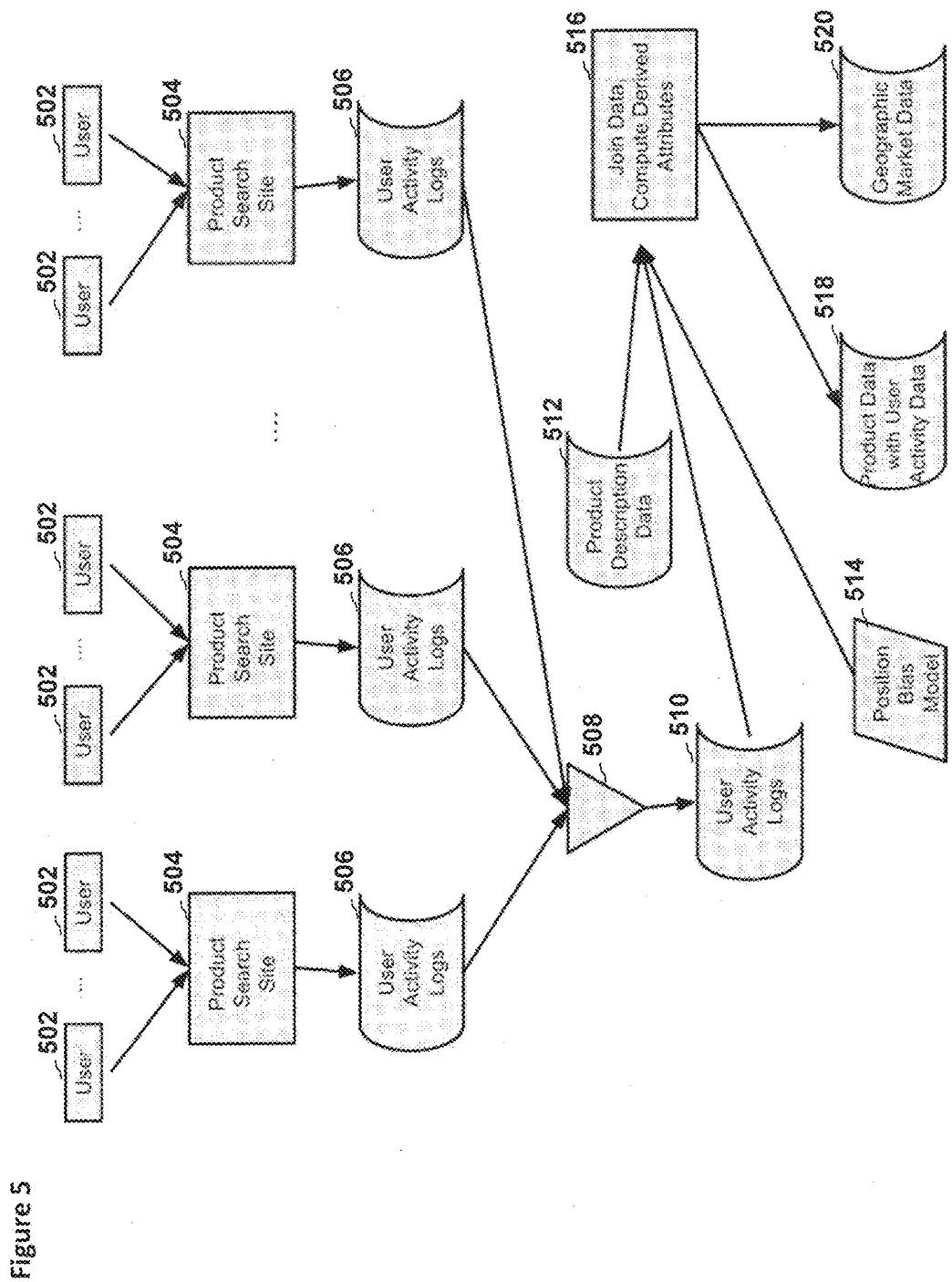
FIG. 5 depicts an embodiment of a process flow diagram illustrating an example of a data collection and analysis process.

FIG. 5 depicts an embodiment of a process flow diagram illustrating an example of a data collection and analysis process. At blocks 502 and 504 various users interact with various product search sites. For example, the product search sites may comprise various internet websites offering used vehicles for sale and showing used vehicle listings. The product search sites can be configured to track and/or record various user activities when the users are interacting with the search sites and/or listings of various vehicles. For example, the product search sites can be configured to allow users to interact with the sites by searching for listings, clicking on listings, comparing listings to other listings, indicating an interest in a listing, etc. The search sites can be configured to track or record these interactions and to associate the tracked or recorded interactions with one or more specific vehicle listing. In some embodiments, the tracking or recording of user activity is performed by a user activity filter, such as the user activity filter 214 of the data collection engine 210 shown in FIG. 2.

At blocks 506 user activity logs are generated. In some embodiments the user activity logs are generated by the various product search sites. In some embodiments the user activity logs are generated by a user activity filter, such as the user activity filter 214 of the data collection engine 210 shown in FIG. 2. The user activity logs may, for example, comprise information describing how users interacted with various listings, such as used vehicle listings, including the tracked or recorded information described above. The user activity logs may, for example, list which vehicle listings users viewed, how long users viewed each listing, where the user clicked within each listing, whether users compared certain listings to other listings, whether a user requested more information on certain listings, etc. The user activity logs in some embodiments can be configured to associate the user activity with specific listings, such as by using a unique item identifier.

At block 508 the various user activity logs are merged together. For example, the user activity filter 214 of the data collection engine 210 can be configured to merge the various user activity logs into one larger user activity log and to store this information in the user activity database 212. Merging the user activity logs may comprise, for example, combining the tracked activity of various users for each individual unique item, because each individual unique item will often be interacted with by more than one user. The merged user activity logs are provided at block 510.

At block 512 product description data is provided. For example, the product description data may comprise the various attributes and/or features of various products listed on the market for sale or historically listed on the market for sale. The product description data can be provided by, for example, the product description database 240 of the significant attributes system 202 shown in FIG. 2. At block 514 a position bias model is provided. The position bias model can be provided by, for example, the position bias models database 242 of the significant attributes system 202.

At block 516 the provided product description data, merged user activity logs, and position bias model are combined and analyzed to determine a relative performance of each item that was viewed by one or more users. The output of this combination may, for example, result in product data with user activity data being output at block 518 and geographic market data being output at block 520. In some embodiments, the product activity filter 216 of the data collection engine 210 of FIG. 2 generates the product data with user activity data and stores this data in the product activity database 250. The market data filter 218 of the data collection engine 210 can be configured to generate the geographic market data and to store this data in the market data database 248. The product data with user activity data output at block 518 may comprise, for example, a description of the user activity for each unique item. This may comprise, for example, unique impressions, clicks, leads, and the like. The geographic market data provided at block 520 may comprise, for example, a description of product inventory and user activity by geographic market. As discussed above, the geographic market may be defined by zip code, demographic marketing area, state, national region, and the like.

Figure 6:
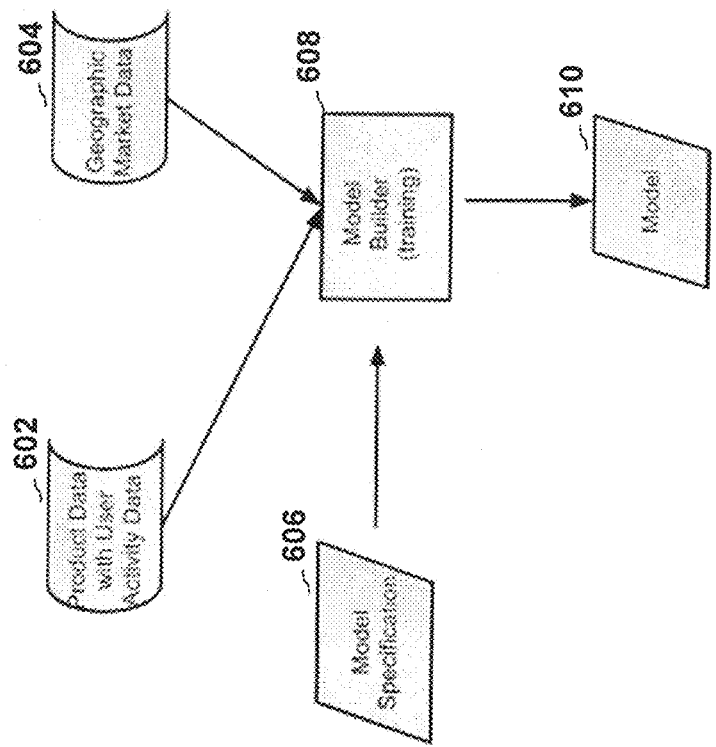
FIG. 6 depicts an embodiment of a process flow diagram illustrating an example of building a model.

FIG. 6 depicts an embodiment of a process flow diagram illustrating an example of building a model, such as a price driver or demand driver model. The process shown in FIG. 6 may be performed by, for example, the model building engine 220 shown in FIG. 2. The process illustrated in FIG. 6 may be used to generate, for example, price driver models and/or demand driver models to be stored in the price driver models database 244 and/or the demand driver models database 246 of the significant attributes system 202 shown in FIG. 2. At block 602 product data with user activity data is provided to, for example, the model building engine 220. The product data with user activity data may comprise, for example, the product data with user activity data output at block 518 of the process shown in FIG. 5. In some embodiments, the product data with user activity data comprises a description of user activity for each unique item, for example, unique impressions, clicks, leads, and the like. The product data with user activity data may be provided by, for example, the product activity database 250. At block 604 geographic market data is provided to, for example, the model building engine 220. The geographic market data may be, for example, the geographic market data output at block 520 of the process shown in FIG. 5. The geographic market data may be provided by, for example, the market data database 248 of the significant attributes system 202 shown in FIG. 2.

At block 606 a model specification is provided. In some embodiments, the model specification may be retrieved from, for example, the specifications database 222 of the model building engine 220. The model specification may comprise, for example, an identification of the explanatory and response variables to be considered, the modeling approach, and the product attributes that are candidates for price and/or demand drivers. At block 608 the price driver model and/or demand driver model are generated. For example, the training generator 226 of the model building engine 220 applies the model specification provided at block 606 to the product data with user activity data and geographic market data provided at blocks 602 and 604 to generate price driver and/or demand driver models. The training generator 226 may use various model training techniques to generate these models. For example, the training generator 226 may use linear regression, non-linear regression, model trees, nearest neighbor analysis, and the like.

At block 610 the model or models are output. The price driver model may be stored in, for example, the price driver models database 244 of the significant attributes system 202. The demand driver model may be stored in, for example, the demand driver models database 246 of the significant attributes system 202. The price driver and demand driver models are stored in their respective databases for use at a later time by, for example, the item analysis engine 230 of the significant attributes system 202 to generate price driver and demand driver information related to a specific unique item as shown and described in FIG. 3.

Figure 7:
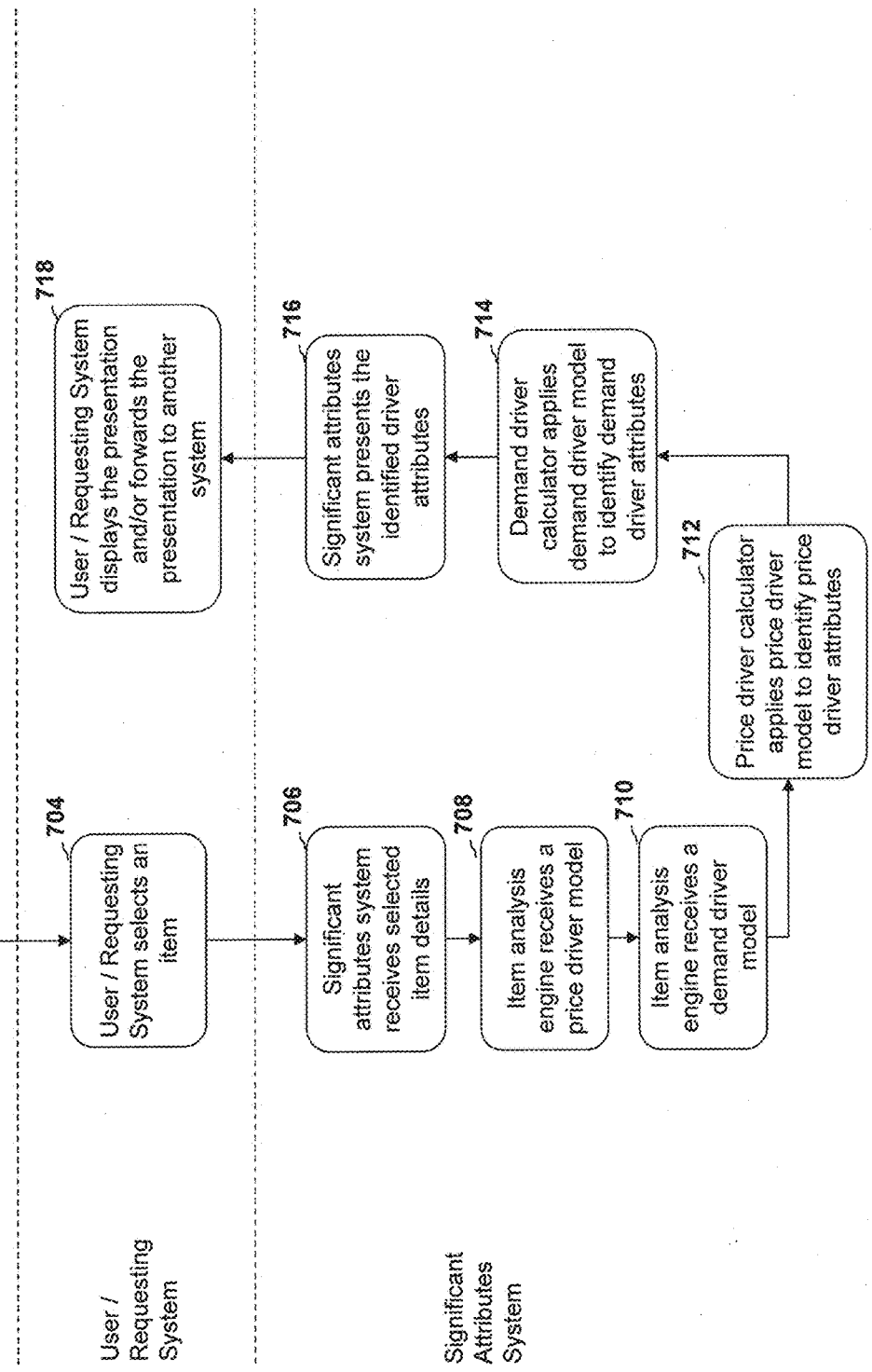
FIG. 7 depicts an embodiment of a process flow diagram illustrating an example of identifying one or more driver attributes of a selected item.

FIG. 7 depicts an embodiment of a process flow diagram illustrating an example of identifying one or more driver attributes of a selected item. The process shown in FIG. 7 may be performed by, for example, the systems shown in FIG. 2. At block 702 a user or requesting system starts the process. At block 704, the user or requesting system selects an item. For example, a user may use a user access point system, such as the user access point system 100 shown in FIG. 2, to select a unique item, such as a used vehicle currently listed for sale or a used vehicle that the user intends to list for sale. At block 706, a significant attributes system receives details of the selected item. For example, the significant attributes system 202 shown in FIG. 2 may receive details of the selected item through the network 204 from, for example, the user access point system 100 or another system, such as a recommendation system 205 or time on market system 206. The selected item details may comprise, for example, attributes of the selected item and/or geographic market data, such as where the item is listed for sale.

At block 708, an item analysis engine receives a price driver model. For example, the item analysis engine 230 shown in FIG. 2 may be configured to retrieve one or more price driver models from the price driver models database 244 of the significant attributes system 202. At block 710, the item analysis engine receives a demand driver model. For example, the item analysis engine 230 of the significant attributes system 202 may be configured to retrieve one or more demand driver models from the demand driver models database 246.

At block 712, a price driver calculator applies the price driver model to the details of the selected item to identify price driver attributes of the selected item. For example, the price driver calculator 234 of the item analysis engine 230 may be configured to apply the price driver model retrieved at block 708 to the details of the selected item received at block 706. At block 714 a demand driver calculator applies a demand driver model to the details of the selected item to identify demand driver attributes of the selected item. For example, the demand driver calculator 236 of the item analysis engine 230 may be configured to apply the demand driver retrieved at block 710 to the details of the selected item received at block 706.

At block 716, the significant attributes system presents the identified driver attributes. For example, the significant attributes system 202 may compile the calculated demand drivers and price drivers from blocks 712 and 714 and present those drivers through, for example, a network, such as the network 204 shown in FIG. 2. At block 718, the user or requesting system displays the presentation and/or forwards the presentation to another system. For example, the user access point system 100 may display the calculated demand and/or price driver attributes to a user using the display interface 208. In another example, a recommendation system, such as the recommendation system 205, may utilize the demand driver and/or price driver attributes in generating a recommendation of alternative items to a user of the recommendation system.

Figure 8:
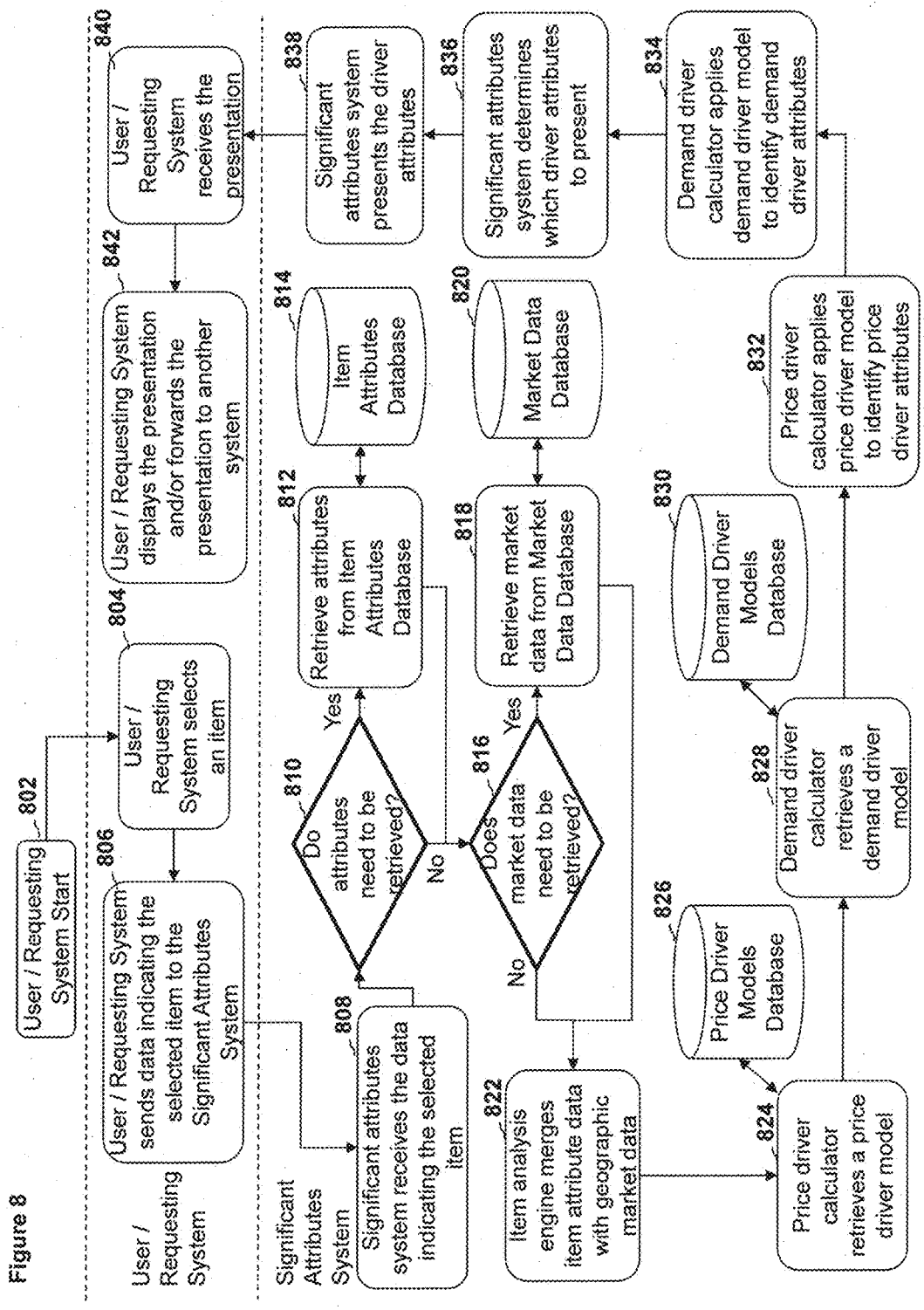
FIG. 8 depicts an embodiment of a process flow diagram illustrating a further example of identifying one or more driver attributes of a selected item.

FIG. 8 depicts an embodiment of a process flow diagram illustrating a further example of identifying one or more driver attributes of a selected item. The process shown in FIG. 8 may be implemented by, for example, the systems shown in FIG. 2. At block 802, a user or requesting system starts the process. At block 804, the user or requesting system selects an item. For example, a user may select an item using the user access point system 100 shown in FIG. 2. The user may use the item selection receiver 207 to indicate a selection of an item that is, for example, currently listed for sale or that the user may be interested in listing for sale. For example, a user that is going to sell his or her used automobile may select that used automobile as the selected item, because the user is interested in determining which attributes of the automobile are price driver and/or demand driver attributes.

At block 806, the user or requesting system sends data indicating the selected item to a significant attributes system, such as the significant attributes system 202 shown in FIG. 2. In some embodiments, the user or requesting system sends data that incorporates various attributes of the selected item. These various attributes may comprise, for example, the item's year, model, body style, trim, and/or other options and features of the item. The data may in some embodiments comprise geographic market data, such as where the item is being offered for sale. In some embodiments, the data sent by the user or requesting system comprises a unique identifier associated with the selected item. In some embodiments, the unique identifier is sent along with other data describing attributes of the item. In other embodiments, the user or requesting system only sends the unique identifier and does not send additional data describing the item, since the significant attributes system may be able to retrieve the other data based on the unique identifier.

At block 808, the significant attributes system receives the data indicating the selected item. In some embodiments, as described above, this data may be a unique identifier, and/or may include various information relating to attributes of the selected item and/or geographic market data. At block 810, the significant attributes system determines whether attributes of the selected item need to be retrieved. For example, if data related to the attributes of the selected item were not included in the data sent from the user or requesting system, the significant attributes system may retrieve that data. If attribute data needs to be retrieved, the process moves to block 812. At block 812, the significant attributes system retrieves attributes relating to the selected item from an item attributes database. For example, the significant attributes system may use a unique identifier received from the user or requesting system to retrieve item attribute data from an item attributes database shown at block 814. The item attributes database may be, for example, the item attributes database or product description database 240 shown in FIG. 2.

Once the item attribute information has been retrieved, or if additional attributes do not need to be retrieved, the process moves to block 816. At block 816, the significant attributes system determines whether market data needs to be retrieved. For example, if the user or requesting system did not send data to the significant attributes system indicating where the selected item is listed for sale or will be listed for sale, the significant attributes system can be configured to retrieve this information from a database. If market data needs to be retrieved, the process moves to block 818. At block 818, the significant attributes system retrieves market data from a market data database. For example, the significant attributes system may utilize a unique identifier sent by the user or requesting system to access geographic market data related to the selected item in a market data database shown at block 820. The market data database shown at block 820 may be, for example, the market data database 248 shown in FIG. 2.

After market data has been retrieved, or if market data does not need to be retrieved, the process moves to block 822. At block 822, an item analysis engine merges the item attribute data with the geographic market data. In some embodiments, the item attribute data may already be merged with the geographic market data, such as when the user or requesting system sends this information to the significant attributes system, instead of sending a unique identifier to the significant attributes system. In other embodiments, however, such as when the item attributes and geographic market data have been retrieved from the item attributes database and market data database, the item analysis engine may need to merge this information prior to applying any price or demand driver models. In merging the data, for example, the geographic market data can be associated with item attribute data or product description information.

At block 824, a price driver calculator retrieves a price driver model. For example, the price driver calculator 234 of the item analysis engine 230 shown in FIG. 2 can be configured to retrieve a price driver model from a price driver models database shown at block 826. The price driver models database shown at block 826 can be, for example, the price driver models database 244 shown in FIG. 2. At block 828, a demand driver calculator retrieves a demand driver model. For example, the demand driver calculator 236 shown in FIG. 2 can be configured to retrieve a demand driver model from a demand driver models database shown at block 830. The demand driver models database shown at block 830 can be, for example, the demand driver models database 246 shown in FIG. 2.

At block 832, the price driver calculator applies the retrieved price driver model to the merged item attribute data and geographic market data to identify price driver attributes of the selected item. At block 834, the demand driver calculator applies the retrieved demand driver model to the merged item attribute data and geographic market data to identify demand driver attributes of the selected item. Application of the price driver and demand driver models can be performed as illustrated in described above with reference to FIG. 3.

At block 836, the significant attributes system determines which driver attributes to present. For example, the significant attributes system may determine to present only a subset of the identified price and/or demand drivers. In some embodiments, the significant attributes system can be configured to present all of the identified price and demand driver attributes. In other embodiments, the significant attributes system can be configured to present, for example, only the most significant price and demand driver attributes. In some embodiments, the significant attributes system can be configured to accept a selection from the user or requesting system that indicates which or how many driver attributes to present. In some embodiments, an administrator of the significant attributes system can configure which or how many driver attributes to present.

At block 838, the significant attributes system presents the driver attributes. For example, the significant attributes system can be configured to send data identifying the price and/or demand driver attributes through a network, such as the network 204 shown in FIG. 2. At block 840, the user or requesting system receives the presentation. For example, the user access point system 100 shown in FIG. 2 may receive the presentation from the significant attributes system through the network 204. At block 842, the user or requesting system displays the presentation and/or forwards the presentation to another system. For example, the user access point system 100 may electronically display the driver attributes to a user using the display interface 208 shown in FIG. 2.

Figure 9:
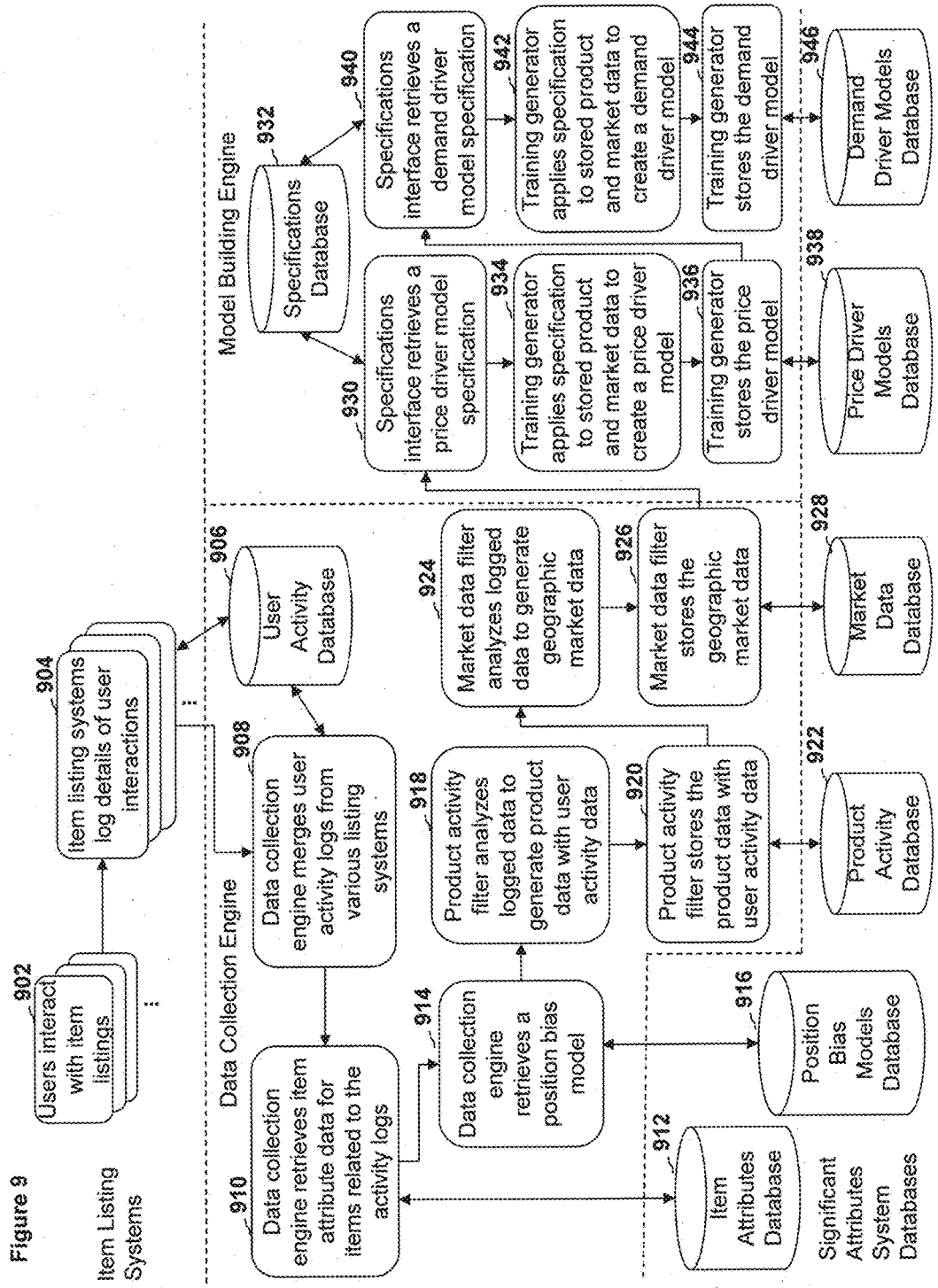
FIG. 9 depicts an embodiment of a process flow diagram illustrating an example of building one or more driver models.

FIG. 9 depicts an embodiment of a process flow diagram illustrating an example of building one or more driver models. The process shown in FIG. 9 may be performed by, for example, the significant attributes system 202 shown in FIG. 2, and more specifically, the data collection engine 210 and model building engine 220. The price and/or demand driver models generated using the process shown in FIG. 9 may be utilized by a significant attributes system to identify price and/or demand drivers of selected items, such as by the processes illustrated in FIGS. 3 and 8.

At block 902 users interact with item listings. For example, one or more item listing systems may list items for sale and allow users to interact with these listings. In one embodiment, various used automobile websites list various used automobiles for sale and allow users of each of those websites to interact with the listings, such as by clicking on listings, comparing one listing to another, expressing interest in a listing, purchasing an item that is the subject of a listing, and/or the like. In some embodiments, the item listing systems are part of a significant attributes system, such as the significant attributes system 202 shown in FIG. 2. In other embodiments, the item listing systems are separate from the significant attributes system. In some embodiments, the process shown in FIG. 9 may involve users interacting with 1, 10, 100, 1000, or more item listing systems.

At block 904 the item listing systems log details of the user interactions. For example, the various item listing systems store data describing or relating to the various user interactions from block 902 in a database. In some embodiments, the item listing systems store this data in a user activity database shown at block 906. The user activity database shown at block 906 may be, for example, the user activity database 212 of the data collection engine 210 shown in FIG. 2. In some embodiments, the item listing systems log user interactions substantially in real time. Logging user interactions substantially in real time may be advantageous to enable relatively quick creation and or updating of price driver models and/or demand driver models in response to user interactions with listings. Logging interactions in real time may also be important, because the item listing systems may be configured to be available substantially 24 hours a day, and a delay in logging user interactions would likely not realistically allow the logging of all or a significant number of the user interactions.

At block 908, a data collection engine merges user activity logs from the various listing systems. For example, the data collection engine 210 shown in FIG. 2 may be configured to retrieve the various user activity logs created by the item listing systems from the user activity database shown at block 906. The data collection engine can be configured to then merge these user activity logs into a single activity log for later analysis. At block 910, the data collection engine retrieves item attribute data for items related to the activity logs. For example, the data collection engine may be configured to access an item attributes database shown at block 912 to retrieve attribute data describing the various items that users interacted with as shown in the activity logs. The item attributes database shown at block 912 may be, for example, the item attributes database or product description database 240 shown in FIG. 2. In some embodiments, the user activity logs and/or the merged user activity log already contains item attribute data for the various items related to the logs, and block 910 is not required.

At block 914, the data collection engine retrieves a position bias model. The data collection engine may be configured to retrieve the position bias model from, for example, a position bias models database shown at block 916. The position bias models database shown at block 916 may be, for example, the position bias models database 242 shown in FIG. 2. As described above, utilizing a position bias model in generating price and/or demand driver models may be advantageous, because user interactions with item listings may be influenced by the position in which an item is displayed to the user among a list of other items.

At block 918, a product activity filter analyzes the logged data to generate product data with associated user activity data. For example, the product activity filter 216 shown in FIG. 2 may be configured to combine the merged user activity log with the product description data retrieved at block 910 and the position bias model retrieved at block 914 to determine a relative performance of each item that was viewed by one or more users. At block 920, the product activity filter stores the generated product data with user activity data in a product activity database shown at block 922. The product activity database 922 may be, for example, the product activity database 250 shown in FIG. 2.

At block 924, a market data filter analyzes the logged data to generate geographic market data. For example, the market data filter 218 shown in FIG. 2 may be configured to combine the merged user activity log with the product description data retrieved at block 910 and the position bias model retrieved at block 914 and analyze this information to generate geographic market data. At block 926, the market data filter stores the geographic market data in a market data database shown at block 928. The market data database shown at block 928 may be, for example, the market data database 248 shown in FIG. 2.

Beginning at block 930, a model building engine is configured to generate price driver and demand driver models based on the product activity and market data generated in previous blocks. At block 930, a specifications interface retrieves a price driver model specification. The price driver model specification may be retrieved from, for example, a specifications database shown at block 932. The specifications database shown at block 932 may be, for example, the specifications database 222 of the model building engine 220 shown in FIG. 2. The model specification may comprise, for example, an identification of the explanatory and response variables to be considered, the modeling approach, and the product attributes that are candidates for price drivers.

At block 934, a training generator applies the price driver model specification to the previously stored product activity and market data to create a price driver model. For example, the training generator 226 shown in FIG. 2 may be configured to retrieve the product data with user activity data from the product activity database shown at block 922 and the geographic market data shown at block 928 and to apply the price driver model specification to this data to generate a price driver model. At block 936, the training generator stores the price driver model in a price driver models database shown at block 938. The price driver models database shown at block 938 may be, for example, the price driver models database 244 shown in FIG. 2.

At block 940, the specifications interface retrieves a demand driver model specification. The specifications interface may be configured to retrieve the demand driver model specification from the specifications database shown at block 932. The demand driver model specification may comprise, for example, an identification of the explanatory and response variables to be considered, the modeling approach, and the product attributes that are candidates for demand drivers.

At block 942, the training generator applies the demand driver model specification to the previously stored product and market data to create a demand driver model. For example, the training generator may be configured to retrieve the product data with user activity data stored in the product activity database shown at block 922 and the geographic market data stored in the market data database shown at block 928 and to apply the demand driver model specification to this data to create the demand driver model. At block 944, the training generator stores the demand driver model in a demand driver models database shown at block 946. The demand driver models database shown at block 946 may be, for example, the demand driver models database 246 shown in FIG. 2. The price driver and demand driver models stored at blocks 936 and 944 may be configured to be used by a significant attributes system to determine or identify price and/or demand drivers, such as is shown and described in relation to FIGS. 3 and 8.

Computing System

Figure 10:
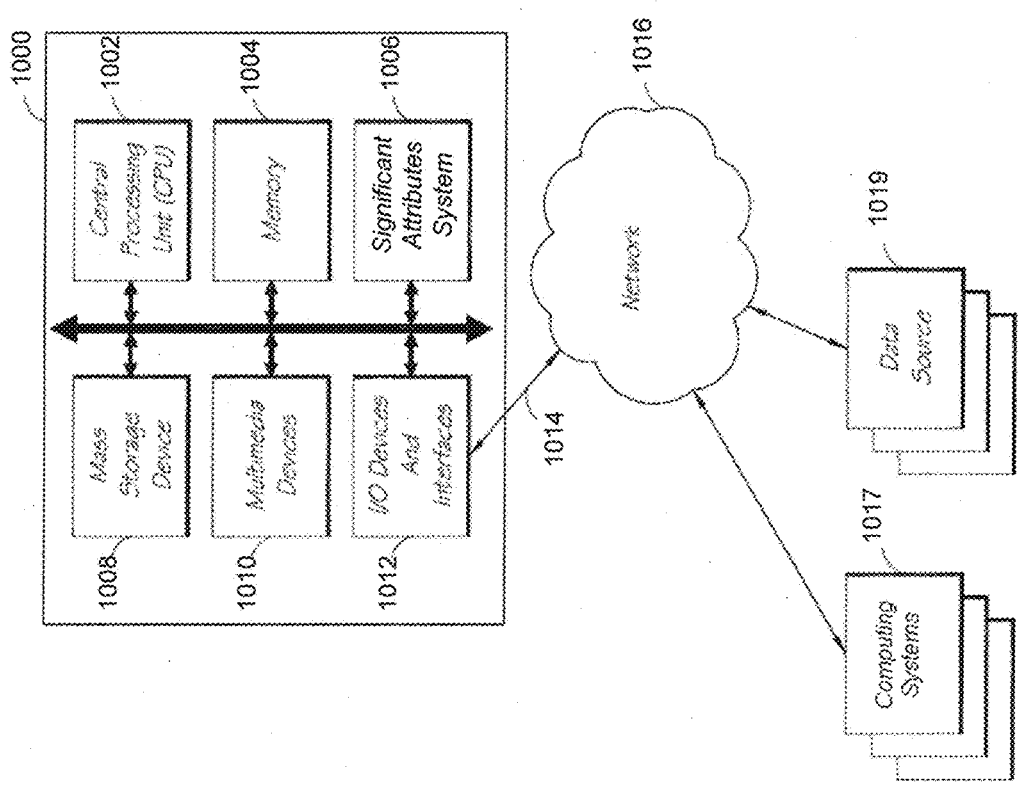
FIG. 10 is a block diagram depicting an embodiment of a computer hardware system configured to run software for implementing one or more embodiments of the significant attributes and user access point systems described herein.

FIG. 10 is a block diagram depicting an embodiment of a computer hardware system configured to run software for implementing one or more embodiments of the significant attributes systems described herein.

In some embodiments, the computer clients and/or servers described above take the form of a computing system 1000 illustrated in FIG. 10, which is a block diagram of one embodiment of a computing system that is in communication with one or more computing systems 1017 and/or one or more data sources 1019 via one or more networks 1016. The computing system 1000 may be used to implement one or more of the systems and methods described herein. In addition, in one embodiment, the computing system 1000 may be configured to manage access or administer a software application. While FIG. 10 illustrates one embodiment of a computing system 1000, it is recognized that the functionality provided for in the components and modules of computing system 1000 may be combined into fewer components and modules or further separated into additional components and modules.

Significant Attributes System Module

In one embodiment, the computing system 1000 comprises a significant attributes system module 1006 that carries out the functions described herein with reference to identifying significant attributes of unique items, including any one of techniques described above. In some embodiments, the computing system 1000 additionally comprises a user activity filter, product activity filter, market data filter, specifications interface, training generator, item description receiver, price driver calculator, demand driver calculator, item selection receiver, and/or display interface that carries out the functions described herein with reference to identifying significant attributes. The significant attributes system module 1006 and/or other modules may be executed on the computing system 1000 by a central processing unit 1002 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

Computing System Components

In one embodiment, the computing system 1000 also comprises a mainframe computer suitable for controlling and/or communicating with large databases, performing high volume transaction processing, and generating reports from large databases. The computing system 1000 also comprises a central processing unit ("CPU") 1002, which may comprise a conventional microprocessor. The computing system 1000 further comprises a memory 1004, such as random access memory ("RAM") for temporary storage of information and/or a read only memory ("ROM") for permanent storage of information, and a mass storage device 1008, such as a hard drive, diskette, or optical media storage device. Typically, the modules of the computing system 1000 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1000 comprises one or more commonly available input/output (I/O) devices and interfaces 1012, such as a keyboard, mouse, touchpad, and printer. In one embodiment, the I/O devices and interfaces 1012 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1012 comprise a microphone and/or motion sensor that allow a user to generate input to the computing system 1000 using sounds, voice, motion, gestures, or the like. In the embodiment of FIG. 10, the I/O devices and interfaces 1012 also provide a communications interface to various external devices. The computing system 1000 may also comprise one or more multimedia devices 1010, such as speakers, video cards, graphics accelerators, and microphones, for example.

Computing System Device/Operating System

The computing system 1000 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1000 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1000 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 10, the computing system 1000 is coupled to a network 1016, such as a LAN, WAN, or the Internet, for example, via a wired, wireless, or combination of wired and wireless, communication link 1014. The network 1016 communicates with various computing devices and/or other electronic devices via wired or wireless communication links. In the embodiment of FIG. 10, the network 1016 is communicating with one or more computing systems 1017 and/or one or more data sources 1019.

Access to the significant attributes system module 1006 of the computer system 1000 by computing systems 1017 and/or by data sources 1019 may be through a web-enabled user access point such as the computing systems' 1017 or data source's 1019 personal computer, cellular phone, smartphone, laptop, tablet computer, e-reader device, audio player, or other device capable of connecting to the network 1016. Such a device may have a browser module that is implemented as a module that uses text, graphics, audio, video, and other media to present data and to allow interaction with data via the network 1016.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1012 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1000 may comprise a physical or logical connection established between a remote microprocessor and a mainframe host computer for the express purpose of uploading, downloading, or viewing interactive data and databases on-line in real time. The remote microprocessor may be operated by an entity operating the computer system 1000, including the client server systems or the main server system, an/or may be operated by one or more of the data sources 1019 and/or one or more of the computing systems 1017. In some embodiments, terminal emulation software may be used on the microprocessor for participating in the micro-mainframe link.

In some embodiments, computing systems 1017 who are internal to an entity operating the computer system 1000 may access the significant attributes system module 1006 internally as an application or process run by the CPU 1002.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 10, the network 1016 may communicate with other data sources or other computing devices. The computing system 1000 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A system for monitoring electronic interactions with unique items and identifying and analyzing significant attributes of the unique items, the system comprising:
 one or more computer readable storage devices configured to store a plurality of computer executable instructions; and
 one or more hardware computer processors in communication with the one or more computer readable storage devices and configured to execute the plurality of computer executable instructions in order to cause the system to:
  generate user activity data by at least electronically communicating, over a computer network, with a plurality of user devices to receive monitoring data related to user interactions with unique items displayed by user interfaces of the plurality of user devices, wherein the monitoring data comprises position data related to a position of a unique item displayed by a user interface at a time of the user interaction;

generate one or more driver models configured to enable identification of which of a plurality of attributes of a selected unique item are driver attributes and to enable determination of values associated with the driver attributes, the plurality of attributes comprising at least a condition attribute and a feature attribute, wherein generating the one or more driver models comprises:

using the position data to reduce any position bias present in the monitoring data; and using one or more of the following methods: linear regression, non-linear regression, model trees, nearest neighbor analysis;

receive selected item data, the selected item data being related to the plurality of attributes of the selected unique item; and apply one or more of the generated driver models to the selected item data to generate values associated with driver attributes of the selected unique item for use in generating recommendations of alternative unique items.

2. The system of claim 1, wherein the selected unique item comprises one of the following types of items: used automobiles, existing homes, real estate, household goods, customized electronics, customized goods.

3. The system of claim 1, wherein the one or more driver models comprises at least one price driver model and at least one demand driver model, the at least one price driver model configured to enable identification of which of the plurality of attributes of the selected unique item are price driver attributes, the at least one demand driver model configured to enable identification of which of the plurality of attributes of the selected unique item are demand driver attributes.

4. The system of claim 1, wherein the generated values associated with the driver attributes of the selected unique item describe at least one of the following: an estimated price contribution of a driver attribute to an overall price of the selected unique item, a perceived value of a driver attribute, a level of desirability of a driver attribute.

5. The system of claim 1, wherein the one or more hardware computer processors are further configured to execute the plurality of computer executable instructions in order to cause the system to:

electronically present an identification of which of the plurality of attributes of the selected unique item are driver attributes.

6. The system of claim 1, wherein the one or more hardware computer processors are further configured to execute the plurality of computer executable instructions in order to cause the system to:

electronically present one or more recommendations of alternative unique items.

7. The system of claim 1, wherein the electronically monitored user interactions comprises at least one of the following: a number of clicks on a hyperlink related to a specific unique item, a number of views of a webpage comprising information related to a specific unique item, a position of a specific unique item in a list of a plurality of specific unique items when a user interacts with the specific unique item, an amount of time a user spends viewing a webpage comprising information related to a specific unique item, a purchase by a user of a specific unique item, information submitted by a user to an advertiser relating to a specific unique item.

8. A computer-implemented method for monitoring electronic interactions with unique items and identifying and analyzing significant attributes of the unique items, the computer-implemented method comprising:

generating, by a computer system, user activity data by at least electronically communicating, over a computer network, with a plurality of user devices to receive monitoring data related to user interactions with unique items displayed by user interfaces of the plurality of user devices, wherein the monitoring data comprises position data related to a position of a unique item displayed by a user interface at a time of the user interaction;

generating, by the computer system, one or more driver models configured to enable identification of which of a plurality of attributes of a selected unique item are driver attributes and to enable determination of values associated with the driver attributes, the plurality of attributes comprising at least a condition attribute and a feature attribute, wherein generating the one or more driver models comprises:

using the position data to reduce any position bias present in the monitoring data; and using one or more of the following methods: linear regression, non-linear regression, model trees, nearest neighbor analysis;

receiving, by the computer system, selected item data, the selected item data being related to the plurality of attributes of the selected unique item; and applying, by the computer system, one or more of the generated driver models to the selected item data to generate values associated with driver attributes of the selected unique item for use in generating recommendations of alternative unique items, wherein the computer system comprises a computer processor and electronic memory.

9. The computer-implemented method of claim 8, wherein the selected unique item comprises one of the following types of items: used automobiles, existing homes, real estate, household goods, customized electronics, customized goods.

10. The computer-implemented method of claim 8, wherein the one or more driver models comprises at least one price driver model and at least one demand driver model, the at least one price driver model configured to enable identification of which of the plurality of attributes of the selected unique item are price driver attributes, the at least one demand driver model configured to enable identification of which of the plurality of attributes of the selected unique item are demand driver attributes.

11. The computer-implemented method of claim 8, wherein the generated values associated with the driver attributes of the selected unique item describe at least one of the following: an estimated price contribution of a driver attribute to an overall price of the selected unique item, a perceived value of a driver attribute, a level of desirability of a driver attribute.

12. The computer-implemented method of claim 8, further comprising:

electronically presenting an identification of which of the plurality of attributes of the selected unique item are driver attributes.

13. The computer-implemented method of claim 8, further comprising:

electronically presenting one or more recommendations of alternative unique items.

14. The computer-implemented method of claim 8, wherein the electronically monitored user interactions comprises at least one of the following: a number of clicks on a hyperlink related to a specific unique item, a number of views of a webpage comprising information related to a specific unique item, a position of a specific unique item in a list of a plurality of specific unique items when a user interacts with the specific unique item, an amount of time a user spends viewing a webpage comprising information related to a specific unique item, a purchase by a user of a specific unique item, information submitted by a user to an advertiser relating to a specific unique item.

15. A computer readable, non-transitory storage medium having a computer program stored thereon for causing a suitably programmed computer system to process by one or more processors computer-program code by performing a method for monitoring electronic interactions with unique items and identifying and analyzing significant attributes of the unique items when the computer program is executed on the suitably programmed computer system, the method comprising:

generating, by a computer system, user activity data by at least electronically communicating, over a computer network, with a plurality of user devices to receive monitoring data related to user interactions with unique items displayed by user interfaces of the plurality of user devices, wherein the monitoring data comprises position data related to a position of a unique item displayed by a user interface at a time of the user interaction;

generating, by the computer system, one or more driver models configured to enable identification of which of a plurality of attributes of a selected unique item are driver attributes and to enable determination of values associated with the driver attributes, the plurality of attributes comprising at least a condition attribute and a feature attribute, wherein generating the one or more driver models comprises:

using the position data to reduce any position bias present in the monitoring data; and using one or more of the following methods: linear regression, non-linear regression, model trees, nearest neighbor analysis;

receiving, by the computer system, selected item data, the selected item data being related to the plurality of attributes of the selected unique item; and applying, by the computer system, one or more of the generated driver models to the selected item data to generate values associated with driver attributes of the selected unique item for use in generating recommendations of alternative unique items, wherein the computer system comprises a computer processor and electronic memory.

16. The computer readable, non-transitory storage medium of claim 15, wherein the selected unique item comprises one of the following types of items: used automobiles, existing homes, real estate, household goods, customized electronics, customized goods.

17. The computer readable, non-transitory storage medium of claim 15, wherein the one or more driver models comprises at least one price driver model and at least one demand driver model, the at least one price driver model configured to enable identification of which of the plurality of attributes of the selected unique item are price driver attributes, the at least one demand driver model configured to enable identification of which of the plurality of attributes of the selected unique item are demand driver attributes.

18. The computer readable, non-transitory storage medium of claim 15, wherein the generated values associated with the driver attributes of the selected unique item describe at least one of the following: an estimated price contribution of a driver attribute to an overall price of the selected unique item, a perceived value of a driver attribute, a level of desirability of a driver attribute.

19. The computer readable, non-transitory storage medium of claim 15, the method further comprising:

electronically presenting an identification of which of the plurality of attributes of the selected unique item are driver attributes.

20. The computer readable, non-transitory storage medium of claim 15, the method further comprising:

electronically presenting one or more recommendations of alternative unique items.

* * * * *